(12) United States Patent
Podack

(10) Patent No.: US 10,947,975 B2
(45) Date of Patent: Mar. 16, 2021

(54) ELECTRIC REFRIGERANT DRIVE

(71) Applicant: BROSE FAHRZEUGTEILE GMBH & CO. KOMMANDITGESELLSCHAFT, WUERZBURG, Wuerzburg (DE)

(72) Inventor: Marcus Podack, Guestrow (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 240 days.

(21) Appl. No.: 15/999,345

(22) PCT Filed: Dec. 15, 2016

(86) PCT No.: PCT/EP2016/081180
§ 371 (c)(1),
(2) Date: Aug. 17, 2018

(87) PCT Pub. No.: WO2017/108572
PCT Pub. Date: Jun. 29, 2017

(65) Prior Publication Data
US 2019/0113034 A1 Apr. 18, 2019

(30) Foreign Application Priority Data

Dec. 23, 2015 (DE) ...................... 10 2015 226 716.4
Apr. 18, 2016 (DE) ...................... 10 2016 206 511.4

(51) Int. Cl.
| | |
|---|---|
| *F01C 1/02* | (2006.01) |
| *F03C 2/00* | (2006.01) |
| *F03C 4/00* | (2006.01) |
| *F04C 18/00* | (2006.01) |
| *F04C 2/00* | (2006.01) |
| *F04C 18/02* | (2006.01) |

(Continued)

(52) U.S. Cl.
CPC ...... *F04C 18/0246* (2013.01); *F04C 18/0215* (2013.01); *F04C 29/0078* (2013.01);
(Continued)

(58) Field of Classification Search
CPC ............ H02K 5/15; H02K 5/24; H02K 1/148; H02K 1/185; H02K 21/14; H02K 3/18;
(Continued)

(56) References Cited

U.S. PATENT DOCUMENTS

| | | | | |
|---|---|---|---|---|
| 4,470,778 | A | * | 9/1984 | Mabe .................... F04C 29/026 418/55.6 |
| 5,104,302 | A | * | 4/1992 | Richardson, Jr. ... F04C 29/0057 418/55.5 |

(Continued)

FOREIGN PATENT DOCUMENTS

| | | |
|---|---|---|
| CN | 103703248 A | 4/2014 |
| CN | 103899537 A | 7/2014 |

(Continued)

*Primary Examiner* — Theresa Trieu
(74) *Attorney, Agent, or Firm* — Laurence A. Greenberg; Werner H. Sterner; Ralph E. Locher

(57) ABSTRACT

An electric refrigerant drive, in particular a refrigerant compressor for an air conditioner of a motor vehicle, has an electric motor drive module and a compressor module coupled to the drive module. The drive module has a motor housing which houses an electric motor with a rotatable motor shaft and is joined to an end shield. The drive module also comprises a fluid-tight housing partition opposite the end shield, thereby forming an electronic housing that receives an electronic motor unit and is closed by a housing cover. The compressor module has a compressor housing which is attached to the end shield of the motor housing of the drive module and which receives a compressor part that is coupled or can be coupled to the drive module so as to be driven.

13 Claims, 11 Drawing Sheets

(51) Int. Cl.
 *H02K 5/24*  (2006.01)
 *F04C 29/00* (2006.01)
 *H02K 21/14* (2006.01)
 *H02K 1/14*  (2006.01)
 *H02K 1/18*  (2006.01)
 *H02K 3/18*  (2006.01)
 *H02K 5/15*  (2006.01)
 *H02K 7/14*  (2006.01)
 *H02K 9/19*  (2006.01)

(52) U.S. Cl.
 CPC ............ *H02K 1/148* (2013.01); *H02K 1/185* (2013.01); *H02K 3/18* (2013.01); *H02K 5/15* (2013.01); *H02K 5/24* (2013.01); *H02K 7/14* (2013.01); *H02K 21/14* (2013.01); *F04C 2240/807* (2013.01); *H02K 9/19* (2013.01)

(58) Field of Classification Search
 CPC ... H02K 7/14; H02K 5/00; H02K 5/16; F04C 29/0078; F04C 18/0215; F04C 18/0246; F04C 23/008; F04B 43/04; F04B 17/03; F04B 13/06; H05K 9/19; H05K 9/193; H05K 11/00; H05K 11/0094
 USPC ........... 418/55.1–55.6, 57, 150, 270, DIG. 1; 417/310, 321, 352, 410.1, 410.5; 310/71, 310/85, 88
 See application file for complete search history.

(56) References Cited

U.S. PATENT DOCUMENTS

| | | | | |
|---|---|---|---|---|
| 5,112,201 | A * | 5/1992 | Tamura | ................ F04C 29/026 418/55.6 |
| 5,515,769 | A * | 5/1996 | Basinski | ................... F04B 9/02 417/420 |
| 6,139,295 | A * | 10/2000 | Utter | ................... F04C 18/0215 418/55.6 |
| 6,202,428 | B1 * | 3/2001 | Katayama | ............... F25B 30/02 62/160 |
| 6,454,551 | B2 * | 9/2002 | Kuroki | ............... F04C 18/0215 418/55.4 |
| 6,619,933 | B2 * | 9/2003 | Ikeda | ..................... F04B 39/06 417/410.1 |
| 8,202,071 | B2 | 6/2012 | Kii et al. | |
| 8,851,259 | B2 | 10/2014 | Hamasaki et al. | |
| 9,803,641 | B2 | 10/2017 | Yamashita et al. | |
| 10,132,316 | B2 | 11/2018 | Nagano et al. | |
| 10,221,840 | B2 | 3/2019 | Guitari et al. | |
| 2004/0191083 | A1 * | 9/2004 | Gennami | .............. F04C 29/026 418/55.6 |
| 2006/0153725 | A1 * | 7/2006 | Koide | ................... F04C 29/026 418/55.6 |
| 2012/0282123 | A1 | 11/2012 | Ichise et al. | |
| 2014/0271233 | A1 | 9/2014 | Calhoun et al. | |
| 2014/0294623 | A1 * | 10/2014 | Forni | ...................... F04C 29/04 418/101 |
| 2014/0375157 | A1 | 12/2014 | Taguchi et al. | |

FOREIGN PATENT DOCUMENTS

| | | |
|---|---|---|
| DE | 102014211123 A1 | 12/2014 |
| DE | 102013021254 A1 | 6/2015 |
| EP | 2131040 A2 | 12/2009 |
| EP | 2444684 B1 | 5/2014 |
| JP | 2005054667 A | 3/2005 |
| KR | 1020110108025 A | 10/2011 |

* cited by examiner

ELECTRIC REFRIGERANT DRIVE

BACKGROUND OF THE INVENTION

Field of the Invention

The invention relates to an electric refrigerant drive, in particular a refrigerant compressor for an air conditioning system of a motor vehicle, having an electric motor drive and a compressor, in particular a scroll compressor, for a refrigerant, for example a chemical refrigerant or carbon dioxide ($CO_2$).

Air conditioning systems that air-condition the vehicle interior, by means of a system that forms a refrigerant circuit, are routinely installed in motor vehicles. Such systems, as a rule, have a circuit through which a refrigerant is passed. The refrigerant, for example R-134a (1,1,1,2-tetrafluoroethane) or R-744 (carbon dioxide), is heated on an evaporator and compressed by means of a (refrigerant) compressor, the refrigerant then releasing the received heat via a heat exchanger before being fed back to the evaporator via a throttle.

SUMMARY OF THE INVENTION

In such applications, for example, scroll machines may in principle be used as compressors for the refrigerant. Such scroll compressors typically have two scroll parts that may be moved relative to one another, and operate in the manner of a positive displacement pump. The two scroll parts in this case are typically designed as a nested (helical) spiral or scroll pair. In other words, one of the spirals at least partially engages in the other spiral. The first (scroll) spiral (i.e. stationary scroll, fixed scroll) is stationary with respect to a compressor housing, and the second (scroll) spiral (i.e. movable scroll) is driven in an orbiting manner within the first spiral by the electric motor.

An "orbiting" motion here refers in particular to an eccentric, circular trajectory, in which the second spiral does not rotate about its own axis. As a result, the scroll parts are always at a minimum distance from each other, and each orbiting motion between the spirals forms two substantially crescent-shaped (refrigerant) chambers, which is increasingly reduced in volume (compressed) during movement. In this case, the coolant to be pumped is drawn in from the outside, compressed inside the scroll parts and discharged via a central outlet in the center of the stationary scroll part (i.e. the center of the spiral).

Such a scroll compressor is known for example from DE 10 2013 021 254 A1. This scroll compressor of the prior art may be used as a refrigerant compressor, with an electric motor eccentrically driving the movable scroll part relative to the stationary scroll part, thus compressing a fluid (i.e. refrigerant). In the refrigerant compressor of the prior art, the electric motor thereof and the scroll compressor are mounted in a shared, one-piece housing, which is closed on the compressor side by means of a housing cover.

The objective of the invention is to provide a particularly suitable electric refrigerant drive that may be flexibly adapted, in particular with regard to the use of different refrigerants.

This objective is achieved according to the invention by the features of the independent claim(s). Advantageous configurations and developments are the subject matter of the dependent claims.

The electric refrigerant drive according to the invention is particularly suitable for and directed to use as a refrigerant compressor for compressing a refrigerant of an air conditioning system of a motor vehicle. To this end, in a preferred installation situation, the refrigerant drive, which is also referred to below as a refrigerant compressor, is arranged in a refrigerant circuit of the air conditioning system. The refrigerant enters the refrigerant compressor via a low-pressure-side inlet, is compressed inside the refrigerant compressor, and exits into the refrigerant circuit via a high-pressure-side outlet.

The electric motor refrigerant compressor according to the invention has a modular structure with a drive module and a compressor module that is or may be coupled thereto. The modules in this case in particular are or may be mounted to a shared compressor assembly on the end side along the axial direction of the refrigerant compressor.

The modular design of the refrigerant compressor allows a high degree of prefabrication and consequently allows for comparatively low manufacturing and assembly costs. In particular, it makes it possible to produce the electric motor drive that the drive module forms, separately from the compressor module that forms the compressor. In this way the flexibility of the refrigerant compressor is also improved because, for example, a drive module may be coupled with different compressor modules adapted to a respective refrigerant. A suitable combination is, for example, a 48V drive in conjunction with a chemical refrigerant, or a high voltage application (typically 350V) in conjunction with a chemical refrigerant (e.g., R-134a) or $CO_2$.

The drive module comprises a motor housing in which an electric motor with a rotatable motor shaft is accommodated. The motor housing is joined on the A side with an end shield through which the motor shaft protrudes at least partially. Opposite the end shield, a fluid-tight housing partition wall is arranged, which forms an electronics housing that is part of the motor housing and is separated from the part of the housing that accommodates the motor components.

The electronics housing accommodates motor electronics that control and/or regulate an electric motor and is closed off, or may be reversibly closed off, by means of a housing cover. In other words, the motor housing and electronics housing preferably form a shared approximately cup-shaped drive housing, which is closed on the opposite end faces of the end shield and the housing cover. The motor housing and electronics housing are in this case designed, in particular, as housing subareas of the drive housing that are separated by the housing partition wall.

The compressor module of the refrigerant compressor has a housing that is preferably detachably coupled to the drive module compressor. For this purpose, the compressor housing is connected or fastened to the A-side end shield of the drive module. To this end, the drive or motor housing may be for example detachably joined to the end face of the compressor housing, preferably in the manner of a flange connection.

To drive the compressor module, it is provided that a movable compressor part accommodated by the compressor housing is or may be coupled propulsively with the drive module. The compressor part is in this case preferably propulsively coupled, or able to be coupled, with a part projecting beyond the end shield (A-side end of the shaft) of the motor shaft.

Preferably, the motor housing has the inlet for the refrigerant on the jacket side, in other words on its outer circumference, and the outlet is expediently furnished at the front or bottom side of the compressor housing, i.e. in particular opposite the drive module.

Due to its modular and complete structure, the electric drive of the drive module comprising the motor electronics may advantageously also be pretested by testing it on a test bench without the compressor module. This simplifies the checking of the refrigerant compressor parts, which has an advantageous effect with regard to production costs and reliable detection of defective products (rejects). Subsequently, the drive may be intentionally directly coupled with the compressor module (compressor head).

The electric drive with the motor electronics and compressor module has separate drive or compressor housings that are suitably screwed together, preferably axially, in the area of the (mechanical) interface, in particular by means of corresponding flange connections or joints. The mounting of the motor or rotor shaft of the electric motor is suitably carried out within the electric drive module by means of preferably two ball bearings, wherein one of the bearings (on the A side) is suitably furnished for the compressor module in the area of the mechanical interface (in the end shield). The other bearing (B-side) is suitably furnished on the (housing) partition wall and there is suitably furnished in a dome-shaped or cylindrical or sleeve-like, wall-fixed bearing receptacle.

With regard to the drive module, the electric motor and the associated (motor) electronics are separated from one another via the/a partition wall within the drive housing. Contact of the motor winding with the electronics occurs solely via bushings through this partition wall that are in particular pressure-tight and/or gas-tight (fluid-tight). This contact is thus furnished in the virtually separate part (electronics housing) of the drive housing. The housing part accommodating the electronics is closed off by means of the housing cover opposite the partition wall.

The electric motor of the drive module is preferably brushless and has rotor-side permanent magnets and on the stator side, has a rotating winding, suitably in the form of a number of (stator) coils, which are arranged on stator teeth arranged in the shape of a star and radially directed inward, preferably by means of coil carriers. The coil ends are interconnected, for example, to a 6-phase motor or rotary field winding, and the interconnection takes place in particular inside the motor housing (the motor-side part of the drive housing). Only the phase ends of the rotating field winding are fed for this purpose (mechanically) into the electronics housing (i.e. the electronics part of the drive housing) via the bushings or feed-throughs of the partition wall. Within the electronics housing, the phase ends are electrically connected to power electronics, preferably two B6 bridge circuits. They are suitably supplied via an intermediate circuit, which is connected to a supply system or electrical system of the motor vehicle by means of a housing-side connection (housing connection section).

In a suitable development, the (mechanical) interface for the propulsive coupling between the drive module and the compressor module, in particular between the drive module and the movable compressor part, is produced by means of a positive connection, in particular a plug connection. As a result, a particularly simple (plug) mounting of the modules is possible, by means of which both the assembly costs and production costs of the refrigerant compressor are advantageously reduced. The simplified assembly continues to be advantageous for the flexibility of the refrigerant compressor.

In a preferred configuration, the coupling, and in particular the positive connection, of the drive module with the compressor module, takes place suitably via the motor shaft, in that the motor shaft is joined (coupled) by means of at least two (A-side) shaft journals with the movable compressor part; the joining is suitably positive and preferably accomplished via shaft pins (shaft extension). This joining connection represents the interface, or a portion thereof, between the drive module and the compressor module. For this purpose, at least two axial joining journals or pins are arranged on the shaft journal, and these engage directly in corresponding joining openings or receptacles of the movable compressor part or in a component, preferably in the form of a balance weight, so that this component in turn is joined to the movable compressor part. The joining pins are in this case radially spaced from each other on the compressor-side end face, and two corresponding joining openings are correspondingly furnished in the movable compressor part or in the component coupled thereto. As a result, a structurally simple and reliable propulsive coupling between the drive module and the compressor module is achieved, while maintaining an installation of the modules that is as low-cost as possible.

In an expedient embodiment, in the area of the mechanical interface, i.e. between the drive module and the compressor module, a pressure or counter-pressure (back-pressure) chamber is formed into which, during operation of the refrigerant compressor, a pressure-driven refrigerant (or refrigerant gas) is introduced which is preferably separated from the lubricant (lubricating oil). In other words, during operation, the counter-pressure chamber takes a refrigerant that has been separated from the high-pressure area of the compressor and is being let down to the medium or low pressure of the counter-pressure chamber. As a result, the movable compressor part is pressed against a stationary compressor part inside the compressor housing, so that (coolant) leaks are largely reduced or completely prevented between the two compressor parts. The preferably gaseous refrigerant suitably still contains a small component of lubricating oil (lubricating oil mist), which is fed to the B-side bearing for lubrication thereof, via a central axial bore of the motor shaft.

A different or further aspect of the refrigerant compressor according to the invention furnishes a central plate between the drive module and the compressor module, in the area of the interface. In particular, the (mechanical) interface is preferably formed by the A-side end shield of the motor housing and by the central plate. The central plate is suitably assigned to the compressor module and arranged on the drive-side end face of the housing, i.e. on the end face of the compressor housing facing the drive module. As a result, a particularly secure and reliable coupling or joining connection is provided between the drive module and the compressor module.

In an advantageous development, the counter-pressure chamber is formed in particular between the end shield of the drive module and the intermediate plate of the compressor module. As a result, a space-reduced arrangement is realized, which advantageously leads to a reduction in the size or the required installation volume for the refrigerant compressor.

In a suitable development, the suction side of the refrigerant compressor is located between the electronic partition wall (housing partition wall) and the mechanical interface to the compressor module, i.e. the (A-side) end shield of the drive module. In the area of this interface, the refrigerant is in a medium pressure range. The high-pressure area of the refrigerant is functionally arranged in the compressor module. In operation, the average (refrigerant) pressure in the medium-pressure area (i.e. back-pressure) thus acts on the movable compressor part and presses it against the stationary compressor part to reduce or prevent leaks. This ensures that the moved or driven compressor part is always as close as possible to the stationary compressor part, in terms of the refrigerant.

In a preferred embodiment, the central plate is provided in the area of the interface and has at least one (passage/orifice) opening, which is connected to a lubricant channel which is in particular circular. The groove- or bead-like lubricant channel is opened to the drive module and is used in the operation of the refrigerant compressor to deliver the lubricant. Preferably, two opposite orifice openings are furnished on the central plate, which are connected to one another via the preferably arc-shaped lubricant channel (guide section, guide channel circle).

In a suitable embodiment, the coolant compressor has a separator for separating (or precipitating) the lubricant and the refrigerant. The separation is done by, for example, gravity or centrifugal force using a difference in the specific gravity between the refrigerant and the lubricant.

The separated or precipitated lubricant (lubricating oil) is fed to the central plate. When the lubricant reaches on the central plate, it is guided or conveyed along the gate-like lubricant channel to the hole-like openings. From the openings, the lubricant is conveyed via the end shield of the drive module to the (A-side) motor or shaft bearing. As a result, and due to the supply of the lubricating oil fraction contained in the refrigerant (gas) that is fed into the counter-pressure chamber, which is fed via an axial channel of the motor shaft (shaft bore) to the opposite B-side shaft bearing, an integrated lubrication of the (roller) bearings of the electric motor is provided that has an advantageous effect on the life and smoothness of the bearings.

The lubricant is expediently a (lubricating) oil which, in addition to lubrication, also serves to cool the components of the electric motor. The term "oil" here is not particularly restricted to mineral oils; in addition, a fully synthetic or semi-synthetic oil, a silicone oil, or other oil-like liquids such as for example a hydraulic fluid or a cooling lubricant may be used. The motor shaft driven by the electric motor is preferably mounted rotatably in the motor housing by means of two roller bearings, in particular by means of two ball bearings. The B-side bearing is mounted to the (housing) partition wall of the drive housing within the motor housing, and the A-side bearing is mounted inside a bearing sleeve of the end shield on the end face facing the compressor module.

In a preferred embodiment, a space is created in the bearing sleeve for at least one component of a balance weight. The balance weight here forms an eccentric shaft extension, which is engaged with by the shaft journal furnished on the shaft end face of the motor shaft, or by the joining pin thereof. The other joining pin, which is radially spaced away from the first-mentioned joining pin, is also furnished on the shaft end face and preferably engages with the balance weight, so that the balance weight cannot exert any rotational movement relative to the rotational movement of the motor shaft. In particular, this converts the rotational movement of the motor shaft into an orbiting movement of the driven compressor part, and in particular of a movable scroll part (scroll spiral). As a result, the compressor part may be driven uniformly, leading advantageously to a reduction in noise during refrigerant compressor operation. In addition, forces arising due to the balance weight with regard to imbalance are reduced, leading to an increase in the service life of the compressor module.

In a suitable development, an inner ring of a compressor-side (shaft) bearing is frictionally mounted (pressed) onto the shaft extension or a shaft journal coupled thereto, while the associated outer ring of this shaft bearing is positively and/or frictionally fit in a bearing sleeve of the movable or driven compressor part. As a result, a reliable mounting of the movable compressor part is realized with regard to the modular structure in a structurally simple manner.

In an expedient configuration, the drive-module-side end shield of the refrigerant compressor has at least one, preferably two, outer-circumferential refrigerant openings as (refrigerant) inlets. The refrigerant openings are arranged on the outer circumference in the area of the compressor-module-side central plate, and in particular are at least approximately diametrically opposite each other. In the assembled state of the refrigerant compressor, these inlets open into the compressor housing, in particular in a recess between a housing inner wall of the compressor housing and a side wall of the stationary compressor part. By means of the refrigerant openings, flow transition areas or guide channels for the refrigerant are straightforwardly realized between the modules.

In a preferred embodiment, the compressor module is designed as a scroll compressor. The compressor module expediently has a scroll part (scroll spiral, fixed scroll) that is fixed or stationary in the compressor housing, and a movable scroll part (scroll spiral) that is driven eccentrically by the electric motor.

In this case, the movable scroll part forms the movable or driven compressor part. The scroll parts each have a plate-shaped or disk-shaped base body on which a helical spiral body is formed projecting axially. In the assembled state, the scroll pair formed in this way is arranged nested; in other words, the spiral body of the movable scroll part engages at least partially in the spiral gap of the stationary scroll part.

BRIEF DESCRIPTION OF THE SEVERAL VIEWS OF THE DRAWING

In the following, an exemplary embodiment of the invention will be explained in greater detail with reference to a drawing. The drawings show the following.

Corresponding parts and sizes are always assigned the same reference numerals in all drawings.

DESCRIPTION OF THE INVENTION

Figure 1:
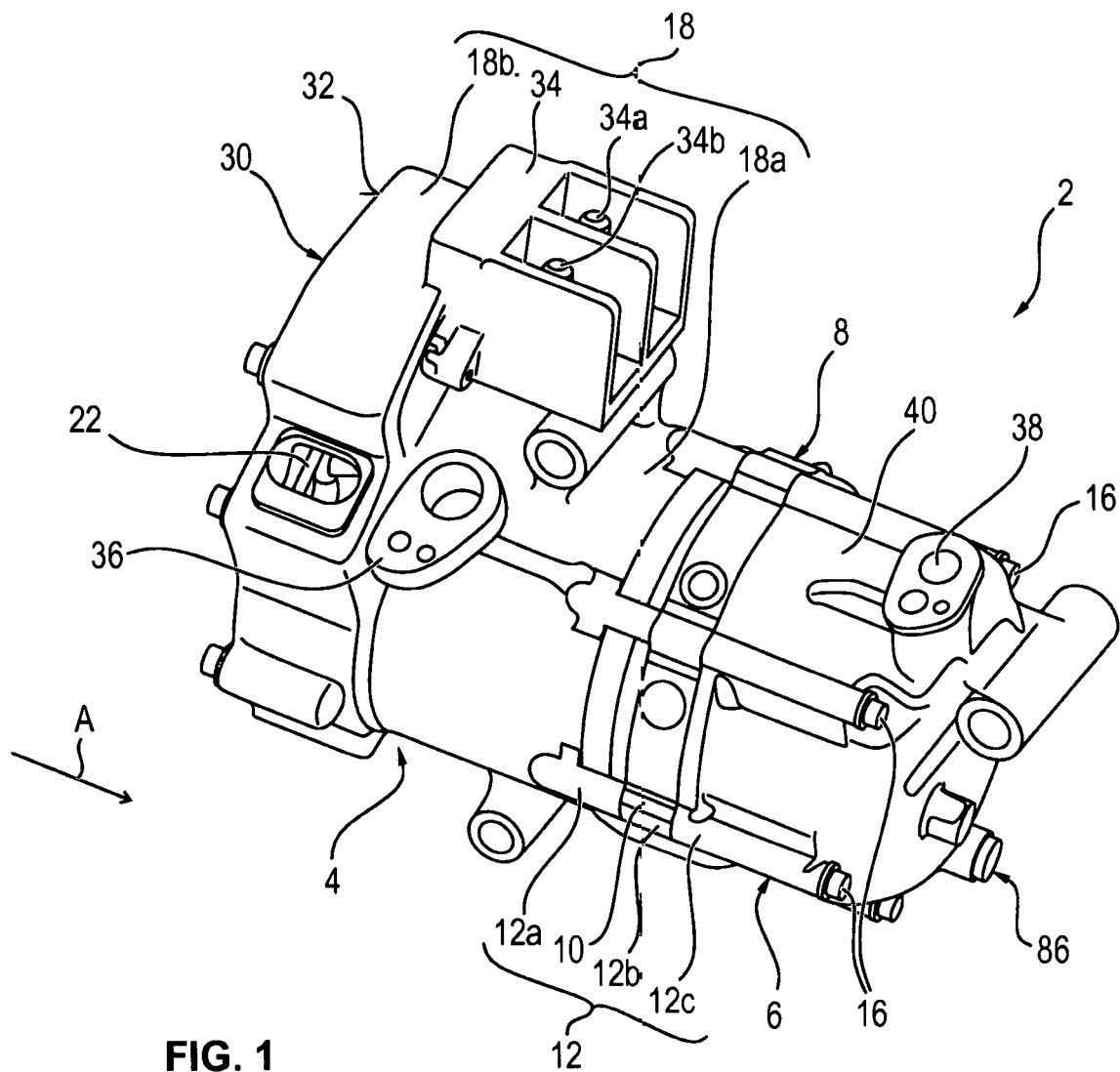
FIG. 1 shows a perspective side view of an electromotive refrigerant compressor having a drive module and a compressor module.

The refrigerant drive 2 shown in FIG. 1 is preferably installed as a refrigerant compressor in a refrigerant circuit, not shown, of an air conditioning system of a motor vehicle. The electromotive refrigerant compressor 2 has an electric (electromotive) drive module 4 and a compressor module (compressor head) 6 coupled thereto. A transition area formed between the modules 4 and 6 has a mechanical interface 8 with a drive-side end shield 10. The compressor module 6 is connected propulsively to the drive module 4 via the mechanical interface 8.

For mounting or fastening, the compressor module 6 is joined to the drive module 4 by means of six flange connections 12 distributed on the circumference. In this case, the flange connections 12 are formed projecting on the outer circumference of the refrigerant compressor 2 as tab-like flanges 12a, 12b, 12c. The flanges 12a, 12b and 12c each have an axial height along an axial direction A of the refrigerant compressor 2.

Each flange connection 12 has a flange 12a of the drive module 4 and a flange 12b of the end shield 10 and a flange 12c of the compressor module 6, each having a mutually aligned screw receptacle 14 into which a fastening screw 16 from the compressor module 6 may be screwed. For this purpose, in particular, the screw receptacles 14 of the flanges 12a of the drive module 4 have an internal thread into which the fastening screw 16 may be frictionally threaded. By means of these six fastening screws 16, the compressor module 6 is attached to the drive module 4 reliably and without vibration. In the drawings, the flange connections 12 are provided with reference numerals only by way of example.

Figure 2:
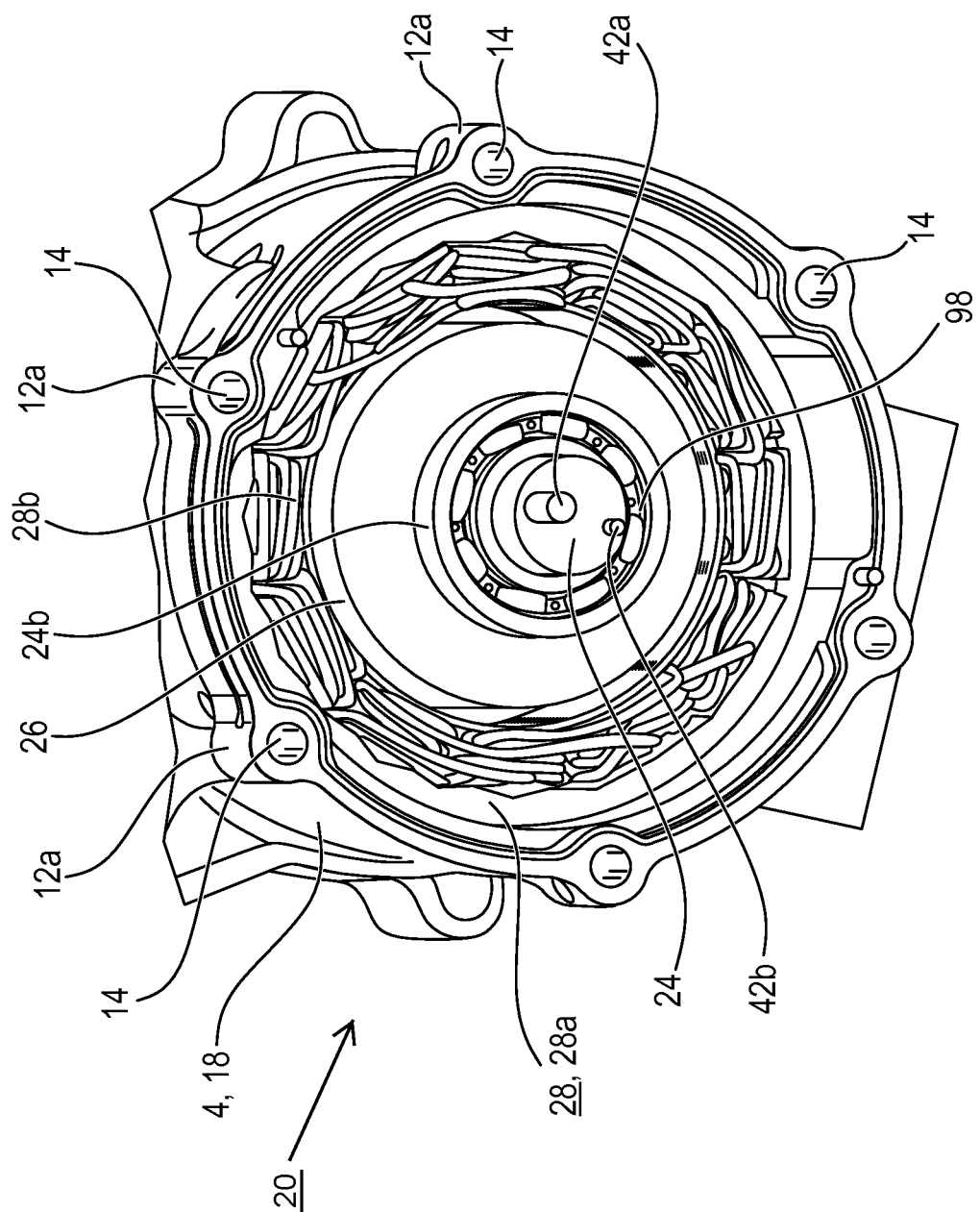
FIG. 2 shows a perspective view of a detail of the electric motor inside a motor housing of the drive module.

The drive module 4 shown in detail in FIG. 2 comprises a cup-shaped drive housing 18 with two housing subareas 18a and 18b, which are separated from each other in a fluid-tight manner by a monolithically integrated housing partition wall 18c inside the drive housing 18.

The compressor module-side housing subarea is formed as a motor housing 18a for accommodating an electric motor 20, and is enclosed by the (housing) partition wall 18c and the end shield 10. The housing subarea opposite the partition wall 18c is designed as an electronics housing 18b, in which are accommodated motor electronics 22 that activate the electric motor 20.

FIG. 2 shows a view of the A-side of the drive housing 18 with a removed end shield 10. The in particular brushless electric motor 20 comprises a rotor 26 which is rotatably disposed arranged inside a stator 28 and rotatably coupled to a motor shaft 24. The stator 28 comprises a laminated core 28a with twelve inwardly directed stator teeth on which is mounted a stator or rotating field winding 28b of the electric motor 20. The coil windings of the individual motor phases of the stator winding 28b are wound on coil bodies, not shown, which are placed on the stator teeth.

The electronics housing 18b is closed off with a housing cover (electronics cover) 30 for the end face 32 of the drive module 4 facing away from the compressor module 6. In the case of an opened housing cover 30, the motor electronics 22 are mounted in the electronics housing 18b; in the case of a removed housing cover 30, in addition, it is easily accessible for maintenance or repair.

In the area of the electronics housing 18b, the drive housing 18 has a housing connection section 34 for electrically contacting the electronics 22 with an electrical system of the motor vehicle. The housing connection section 34 comprises two motor connections 34a and 34b, which are fed to the electronics 22 and are electrically contacted therewith inside the electronics housing 18b.

The drive housing 18 has a (refrigerant) inlet 36 for connecting to the refrigerant circuit, approximately at the height of the housing connection section 34. Via the inlet 36, a refrigerant from the refrigerant circuit flows into the drive housing 18, in particular into the motor housing 18a. From the motor housing 18a, the refrigerant flows through the end shield to the compressor module 6. The refrigerant is then compressed by means of the compressor module 6 and exits into the refrigerant circuit of the air conditioning system at a bottom-side (refrigerant) outlet 38 of the compressor module 6.

The outlet 38 is formed on the bottom of a cup-shaped compressor housing 40 of the compressor module 6. In the connected state, the inlet 36 in this case forms the low-pressure or suction side and the outlet 38 forms the high-pressure or pumping side of the refrigerant compressor 2.

Figure 3B:
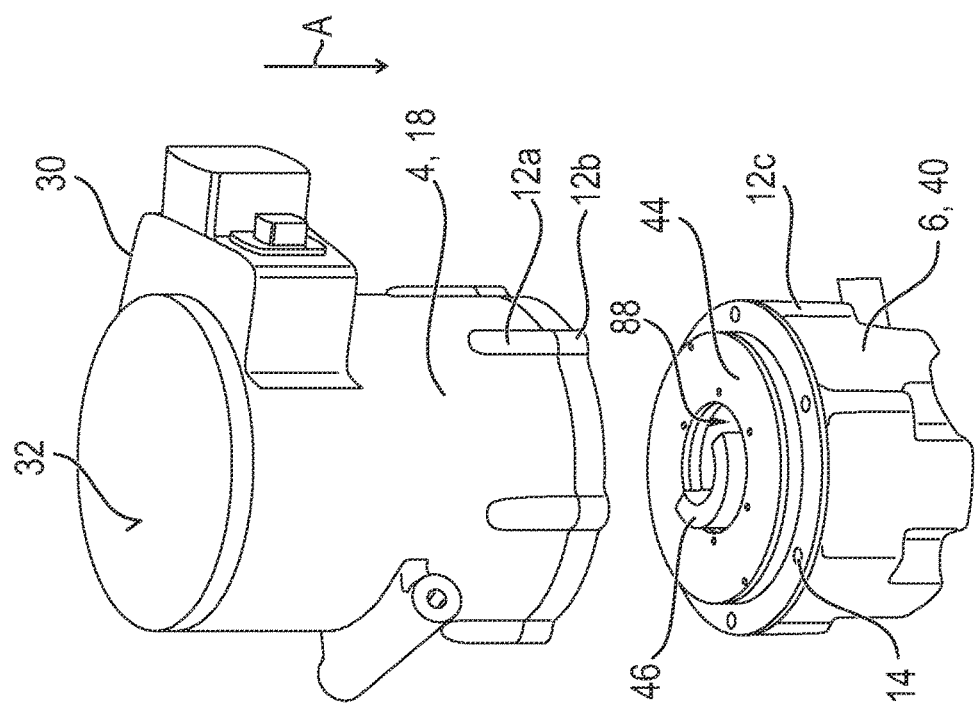
FIG. 3b shows a perspective view of the refrigerant compressor according to FIG. 2a, viewing a housing cover of the drive module.
Figure 3A:
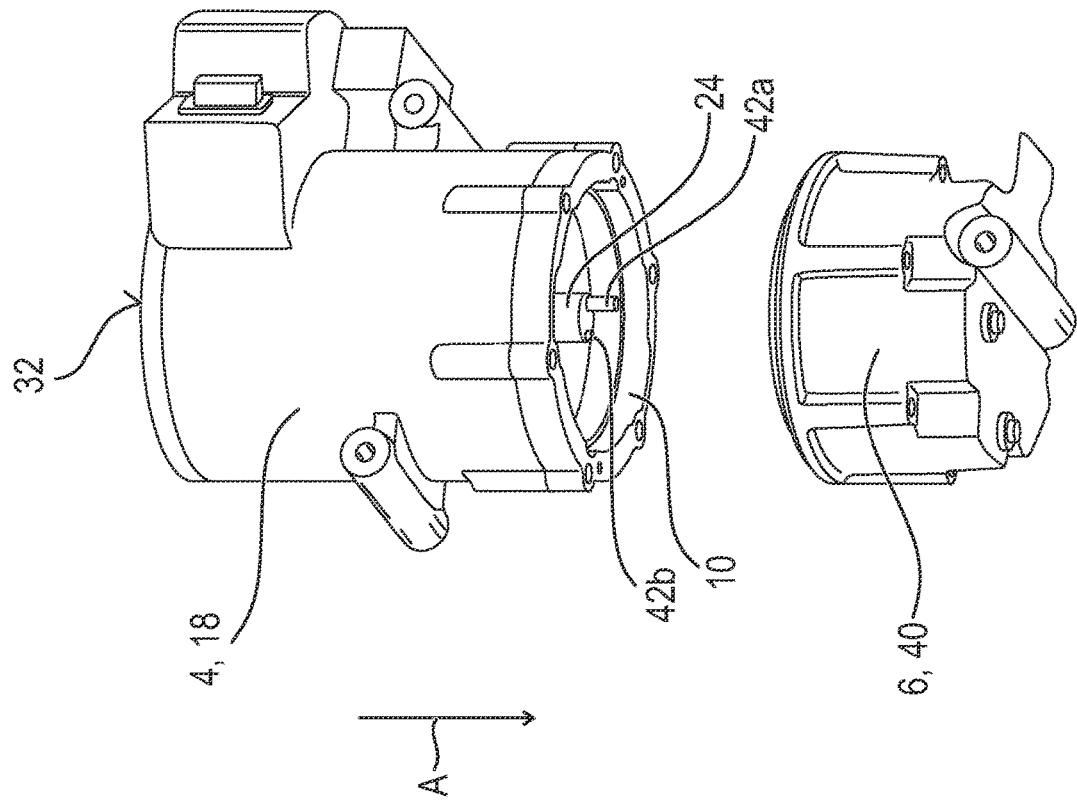
FIG. 3a shows a perspective view of the electromotive refrigerant compressor in a partially disassembled state, viewing a base of the compressor module.

As may be seen comparatively clearly in FIGS. 3a and 3b, the end shield 10 is arranged on the A side of the drive module 4. FIG. 3a shows the motor or rotor shaft 24 of the electric motor 20. The motor shaft 24 has two shaft or joining pins 42a and 42b for propulsive coupling to the compressor module 6. The joining pins 42a and 42b are used in particular for the purpose of a positive plug connection with the compressor module 6. The joining pins 42a and 42b are in this case radially spaced from one another on the end face of the motor shaft 24, and are integrally or monolithically formed as projecting shaft extensions.

FIG. 3b shows a central plate (center plate) that is 44 assigned to the compressor module 6. This central plate 44 is arranged as a central plate unit or ring unit on the drive-side end face of the compressor module 6. Within the central opening of the ring-shaped central plate 44, a shaft extension 46, which may be coupled with the joining pins 42a and 42b, is mounted with a half-ring-shaped balance weight 46a and a compressor-side shaft journal 46b. The shaft extension 46 is mounted within the central plate 44, eccentrically with respect to the rotational axis of the motor shaft 24, when the refrigerant compressor 2 is in the assembly or joining state. The balance weight 46a serves to compensate for an imbalance of the compressor module 6, which is preferably designed as a scroll compressor.

Figure 4:
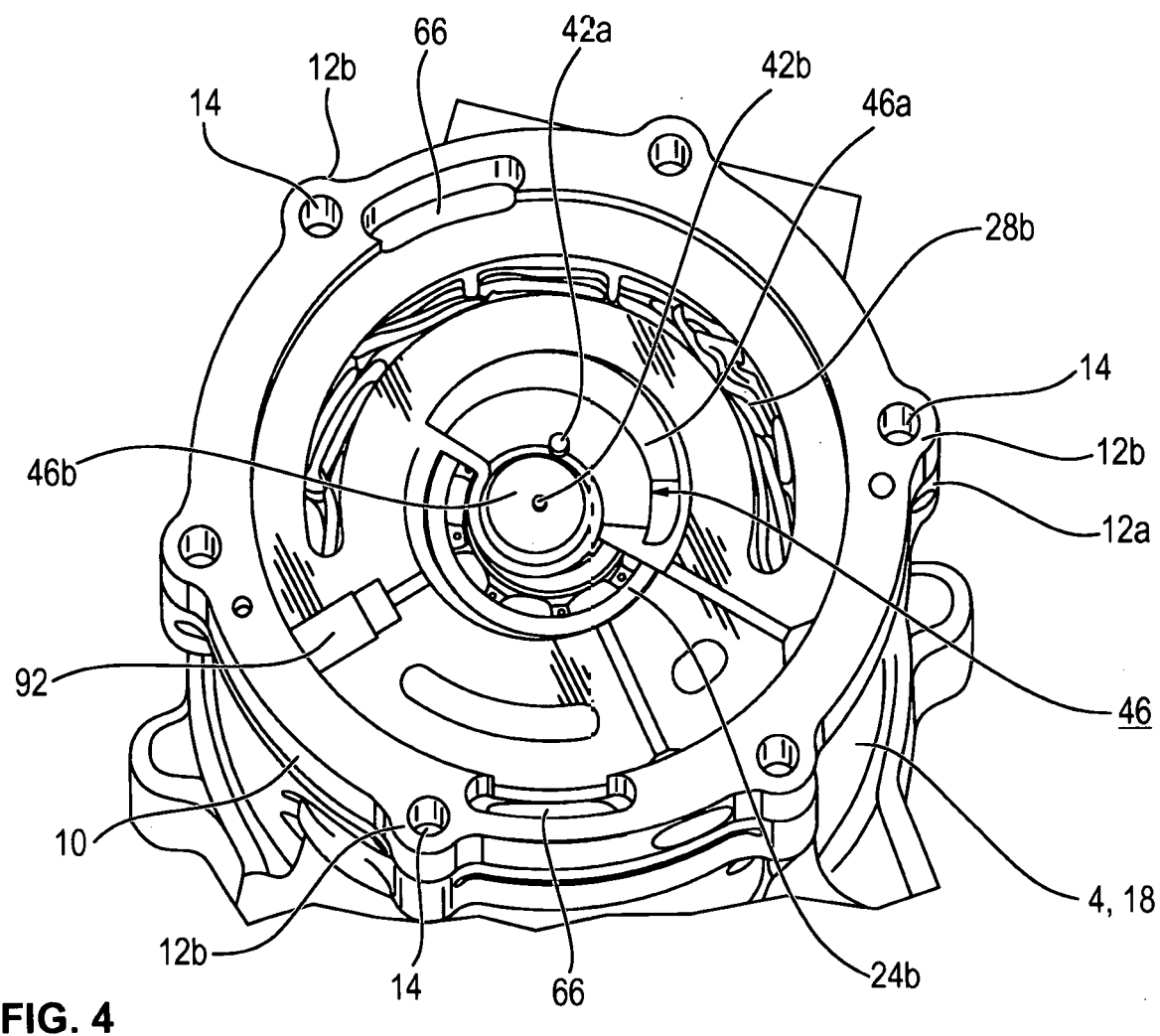
FIG. 4 shows a perspective view of an end shield of the motor housing with an eccentric shaft extension with a balance weight assembled on a motor shaft of the electric motor.

FIG. 4 shows the end face of the end shield 10 facing the compressor module 6, with the eccentric shaft extension 46 plug-mounted on the motor shaft 24. As may be seen comparatively clearly in FIG. 4, the radially offset joining pins 42a and 42b engage positively with the shaft extension 46. The joining pin 42a is, here, in particular in a positive connection with a receptacle of the shaft journal 46b, and the joining pin 42b is positively inserted into a receptacle of the balance weight 46a.

Figure 5:
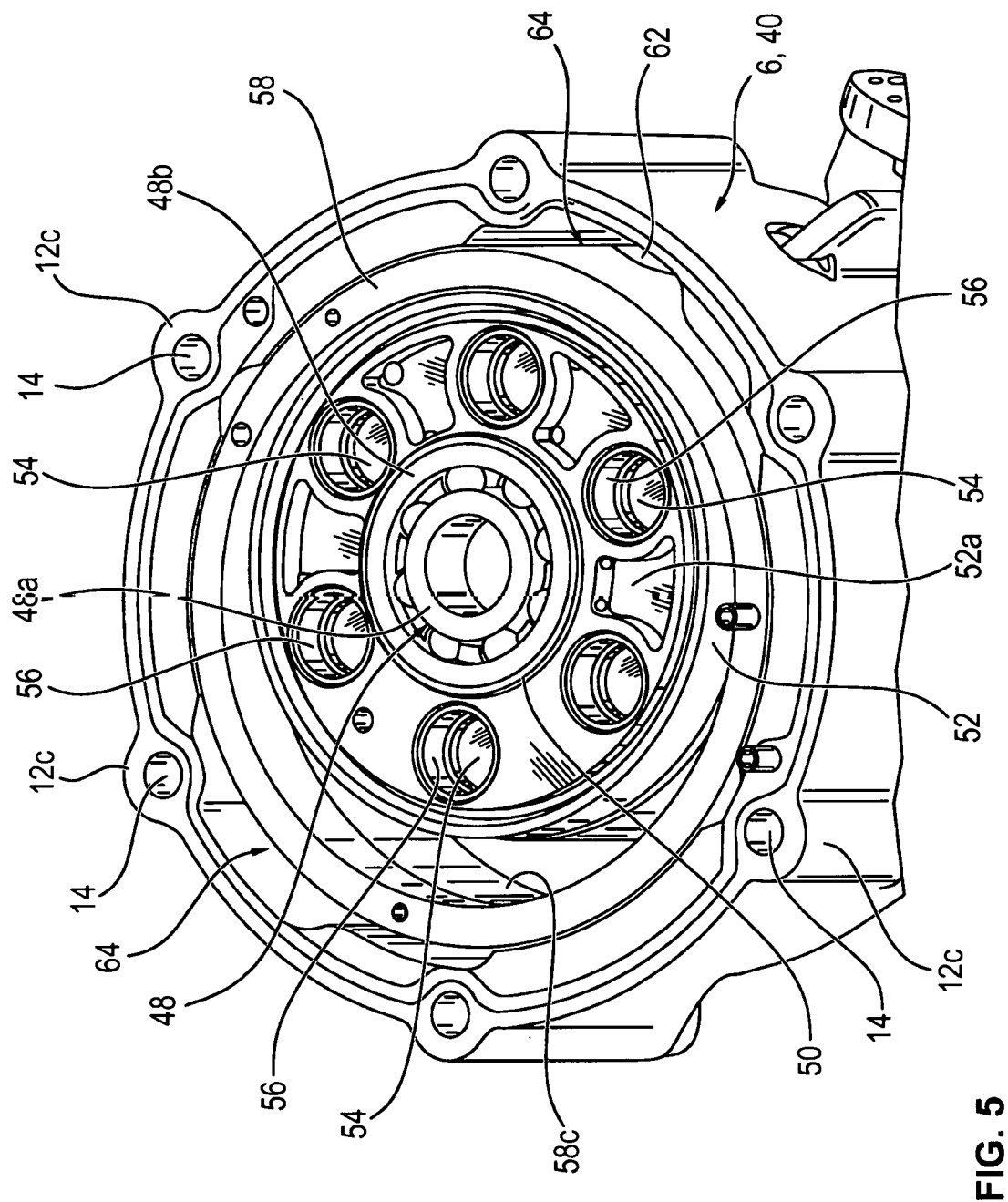
FIG. 5 shows a perspective view of a drive-side end face of the compressor module with a roller bearing.

In the assembled state, a compressor-side roller or ball bearing 48 is placed on the shaft journal 46b. The roller bearing 48 shown in FIG. 5 sits in a bearing receptacle 50 of a compressor part 52 of the compressor module 6 that may be driven by the motor shaft 24 when in the joined state. In the joined state, the shaft journal 46b sits in an inner ring 48a of the roller bearing 48, and the corresponding outer ring 48b is seated positively on the inner wall of the bead-like bearing receptacle 50.

Six bead-like openings 54 are arranged around the bearing receptacle 50, and in the assembled state, a pin extension of the central plate 44 engages in each of these openings respectively. To reduce friction, a slide ring 56 is respectively inserted in the openings 54. During compressor operation, the circular opening walls having slide rings 56 roll onto the pin extensions, and as a result, the rotational movement of the motor shaft 24 is converted into an eccentric, orbiting scrolling movement of the movable compressor part 52 relative to a stationary compressor part 58 of the compressor module 6.

In other words, the mechanical interface 8 between the drive module 4 and the compressor module 6 is substantially formed by the operative connection of the joining pins 42a and 42b of the motor shaft 24 with the shaft extension 46 that is mounted in the bearing receptacle 50 of the scroll disk 52a. A reliable propulsive connection of the movable scroll part 52 is provided to the drive module 4 as a result of the positive fit of the joining pins 42a and 42b with the receptacles of the balance weight 46a and the shaft journal 46b, as well as the positive connection of the shaft journal 46b in the roller bearing 48 or of the roller bearing 48 in the bearing receptacle 50.

The compressor module 6, described in greater detail with reference to FIGS. 6 to 9, has a nested (helical) spiral or scroll pair 60. In this case, the scroll pair 60 comprises the stationary (fixed) compressor or scroll part 58 (FIG. 7) with respect to the compressor housing 40 as well as the compressor or scroll part 52 (FIG. 6) that is movable relative thereto. The scroll or compressor parts 52 and 58 each have a scroll disk 52a, 58a, on each of which a spiral body 52b, 58b is formed projecting along the axial direction A. In the assembled state of the compressor module 6, the spiral body 52b of the movable scroll part 52 engages in the clearances or spaces of the spiral body 58b of the stationary scroll part 58.

The scroll part 52 is orbitally moved by means of the eccentrically arranged shaft journal 46b of the shaft extension 46 when the motor shaft 24 rotates along a circular path, and in this way is driven by the drive module 4 during compressor operation. In this case, the spiral bodies or scroll spirals 52b and 58b keep a minimum distance from each other, and by this means, at each orbiting revolution between the spiral bodies 52b and 58b, two increasingly smaller (refrigerant) chambers are formed for conveying and compressing the refrigerant. The refrigerant to be compressed is in this case drawn in via two inlet openings 62 of a side wall 58c of the scroll part 58 from a respective assigned intermediate portion or recess 64 formed between the side wall 58c and the compressor housing 40; compressed inside the compressor module 6; and expelled via the bottom (refrigerant) outlet 38 (FIG. 9) in the center of the spiral of the scroll part 58.

Figure 6:
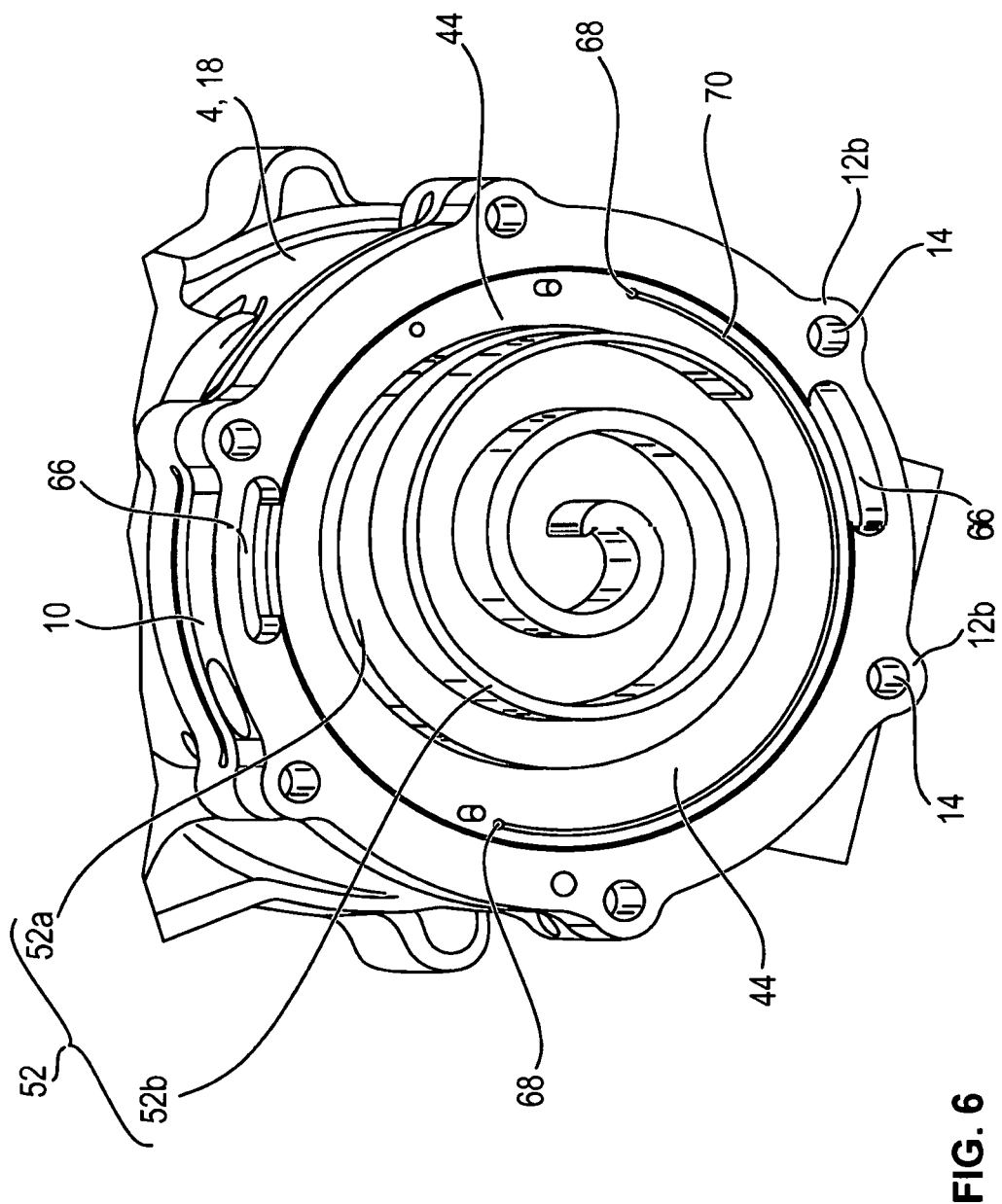
FIG. 6 shows a perspective view of a detail of a stationary scroll part of the compressor module.
Figure 7:
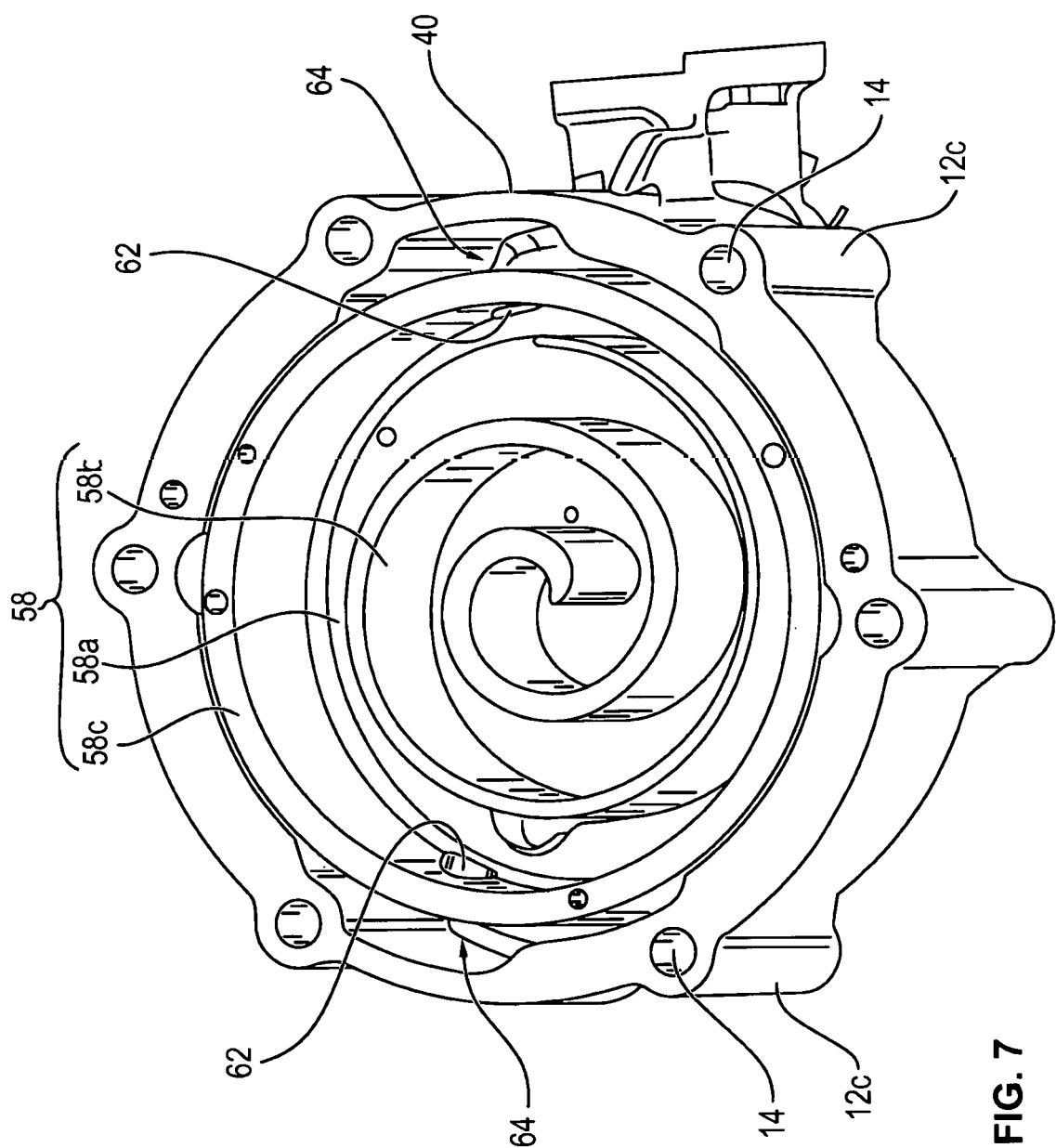
FIG. 7 shows a perspective view of a detail of a central plate and a movable scroll part of the compressor module.

FIG. 7 shows the stationary scroll part (fixed scroll) 58 with the spiral body thereof 58b, inserted into the compressor housing 40. The two identifiable recesses 64 between the compressor housing 40 and the side wall 58c, together with the inlet opening 62 and the orifice or refrigerant openings 66 (FIG. 6) introduced inside the end shield 10, each form a channel suitable for conveying coolant. The refrigerant openings 66 are in this case introduced into the end shield 10 at the outer circumference, and in the assembled state, they are arranged in alignment with the recesses 64.

FIG. 6 shows the refrigerant compressor 2 with the compressor housing 40 removed, viewing the spiral body 52b of the movable scroll part 52. The central plate (center plate) 44 has two diametrically opposite hole-like openings 68, on the surface facing the compressor module 6 as a lubricant orifice from the high pressure side to the counter-pressure side and the low-pressure side of the refrigerant compressor 2.

The orifice openings 68 are connected to one another by flow via an arc-shaped lubricant channel 70 along the outer circumference of the central plate 44. The lubricant channel 70 formed as a guide bead or groove serves to feed a lubricant that has been separated or precipitated from the coolant by means of a (lubricant) separator 72.

Figure 8:
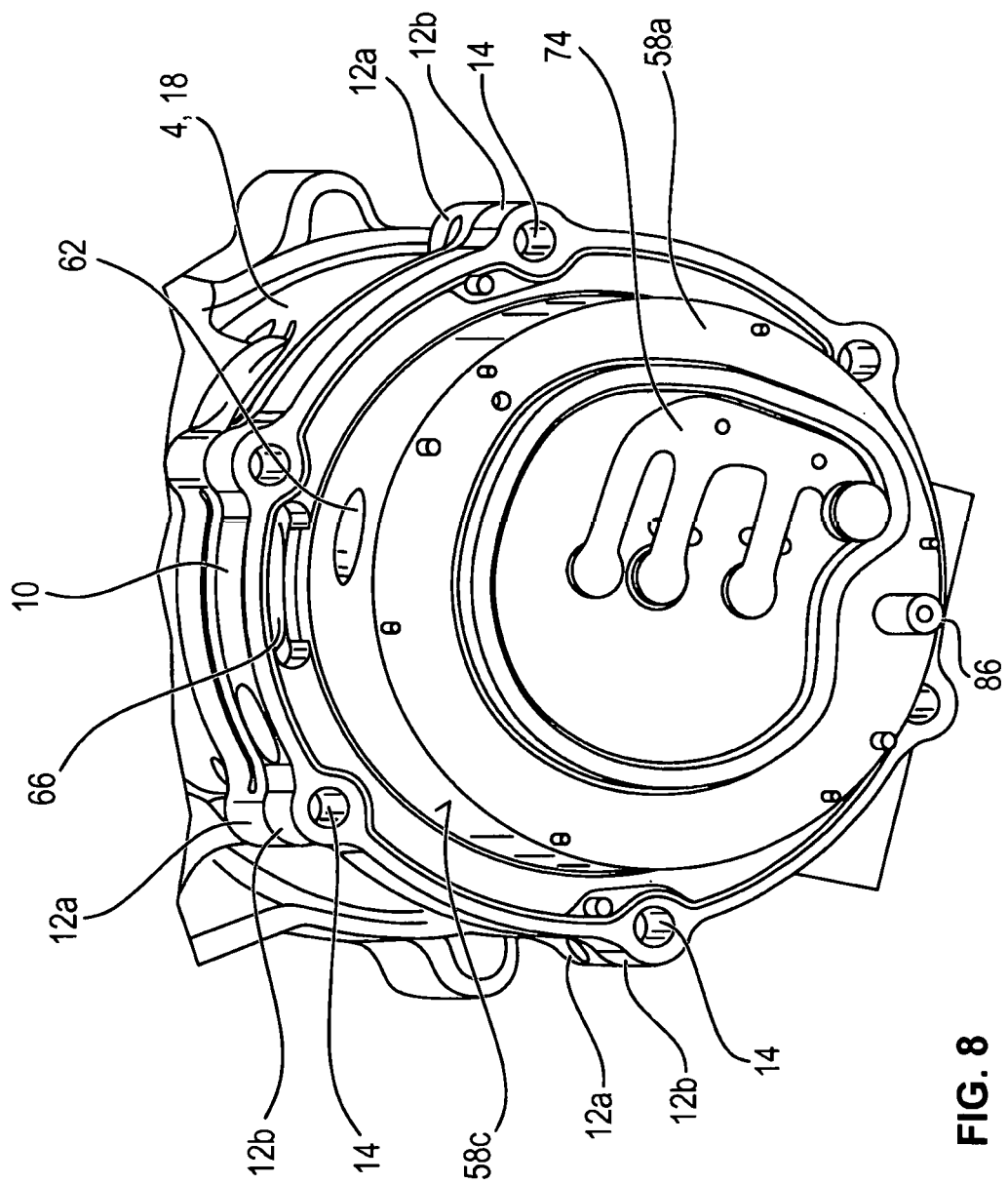
FIG. 8 shows a perspective view of the underside of the compressor module with a compressor housing removed, viewing a multi-limbed cover part.
Figure 9:
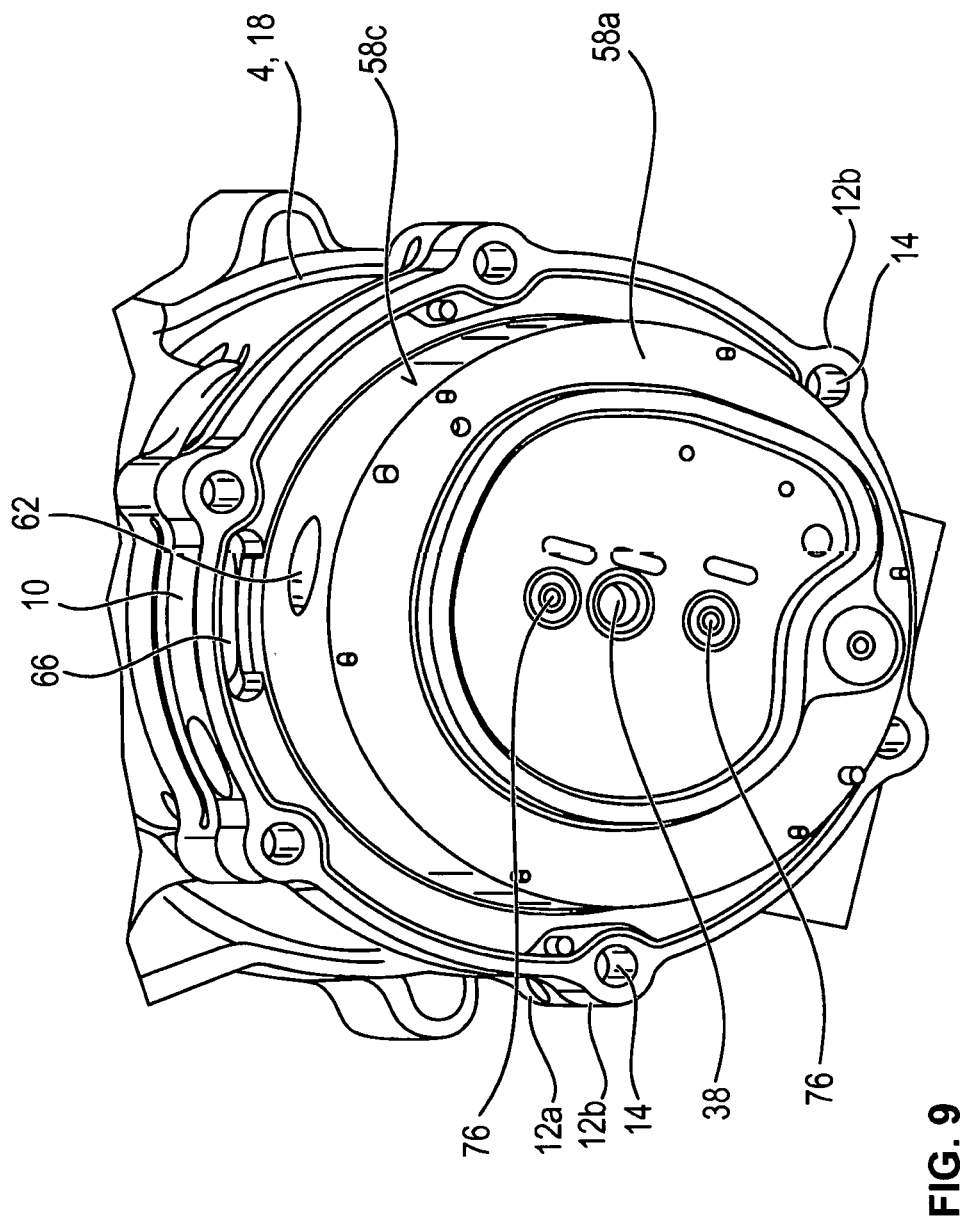
FIG. 9 is a perspective view of the underside of the compressor module of FIG. 8, without the cover part.

FIG. 8 and FIG. 9 show a detail of the compressor module 6 of the electromotive refrigerant compressor 2 with a compressor housing 40 removed. The stationary scroll part 58 has on its underside a multi-limbed cover part 74, which covers the central, high-pressure-side refrigerant outlet 38 of the scroll disk 58a. Radially spaced from the refrigerant outlet 38, two "pre-outlets" 76 are furnished as pre- or auxiliary outlets or as pre- or auxiliary outlet valves of the scroll disk 58a, and by this means, an over-compression of the refrigerant in the compressor operation is prevented.

Figure 10:
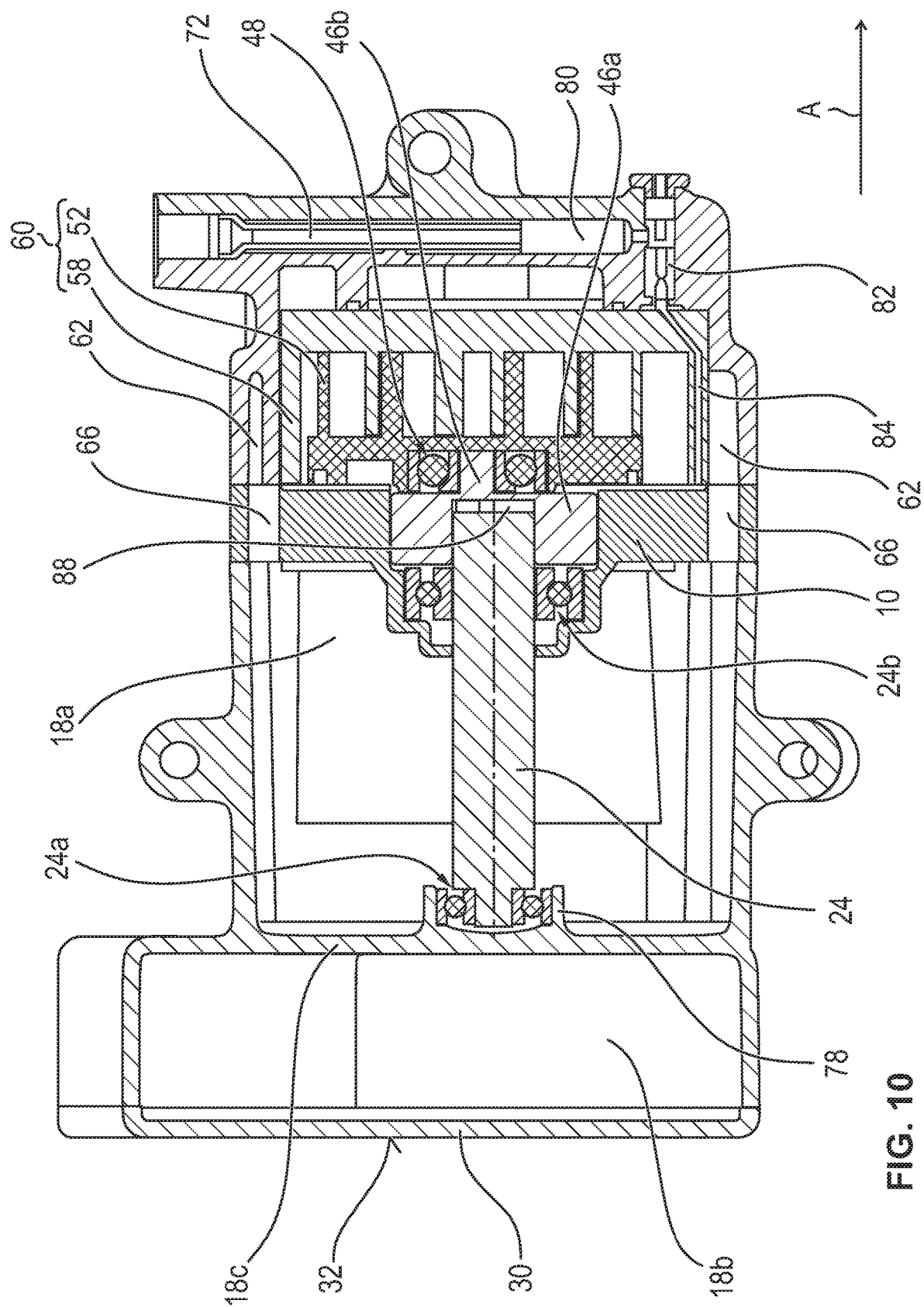
FIG. 10 is a sectional view of a first axial longitudinal section through the electromotive refrigerant compressor.
Figure 11:
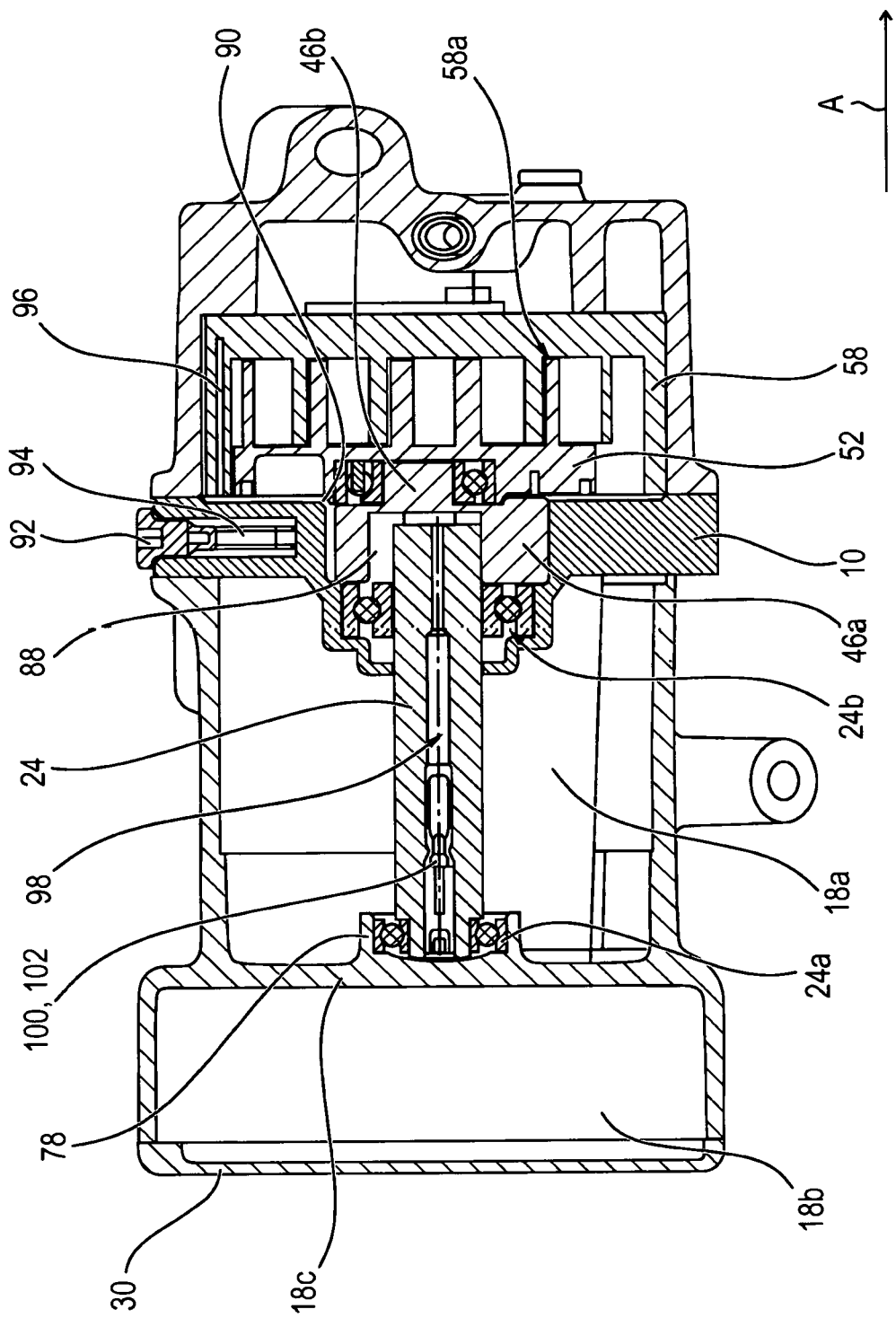
FIG. 11 is a sectional view of a second axial longitudinal section through the electromotive refrigerant compressor.

FIG. 10 and FIG. 11 show the electromotive refrigerant compressor 2 in different axial longitudinal sections with the electronics 14 and electric motor 12 removed. As may be seen comparatively clearly in these longitudinal sections, the partition wall 18c separates the housing subarea of the motor housing 18a from the housing subarea of the electronics housing 18b in a fluid-tight manner, in particular also with regard to a fluid or refrigerant pressure occurring in the subareas.

The partition wall 18c has an integrally formed bearing receptacle 78 for a roller bearing or ball bearing 24a. The end shield 10 arranged opposite the partition wall 18c has a corresponding roller or ball bearing 24b, and the central motor shaft 24 is rotatably mounted in the two ball bearings 24a and 24b that are fixed to the housing.

The lubricant separator 72 acts in the manner of a cyclone separator. The in particular gaseous refrigerant exits via the separator 72 at a high (refrigerant) pressure. When exiting in this way, the lubricant present in the refrigerant is separated into a lubricant chamber 80 and returned via a valve or a throttle 82 to the stationary scroll part 58 via a lubricant channel 84. The throttle 82 in this case is seated in an axial throttle chamber 86 of the compressor housing 40.

The lubricant channel 84 of the stationary scroll part 58 guides the lubricant to the orifice openings 68. The recirculated lubricant then flows through guide contours of the end shield 10 to the roller bearings 24a and 24b of the electric motor 20 to lubricate and/or cool these bearings.

The movable scroll part 52 is propulsively coupled to the motor shaft 24 by means of the shaft extension 46 of the central plate 44. A counter-pressure chamber (back pressure chamber) 88 of the refrigerant compressor 2 is furnished in the area of the end shield 10 (FIG. 11). The counter-pressure chamber 88 is connected flow-wise to a chamber inlet 90, which in the exemplary embodiment extends at least partially within the end shield 10 and comprises the volume inside the end shield 10 that is not occupied by the eccentric shaft extension 46 with the balance weight 46a and the central plate 44. In the end shield 10, a radially extending channel 92 is introduced, and in the assembled state, a throttle or shutter 94 is seated therein.

Radially opposite the lubricant channel 84, a gas channel 96 is introduced into the scroll part 58; the channel opens into the counter-pressure chamber 88 via the throttle 94 and the chamber entry or chamber inlet 90. A chamber outlet or vent 98 of the counter-pressure chamber 88 is designed substantially as an axial bore of the motor shaft 24 and thus extends in the axial direction of the bearing-shield-side roller bearing 24b to the partition-wall-side roller bearing 24a.

When the electromotive refrigerant compressor 2 is operating, the refrigerant has a high pressure (about 25 bar) in the compressor module 6, a low pressure (about 3 bar) in the motor housing part 18a, and a medium pressure in the area of the interface, i.e. approximately in the area of the counter-pressure chamber 88. By means of the housing partition wall 18c, the electronics housing 18b is isolated by pressure from the motor housing 18a, and in particular, the interior of the electronics housing 18b is always at atmospheric pressure during compressor operation, so the electronic parts of the electronics 22 are not damaged.

This configuration of the electromotive refrigerant compressor 2 provides a particularly advantageous counter-pressure functionality and a functional division of the gas and oil return. Thus, starting from the high-pressure side, only the lubricant deposited on the lubricant separator 72 is fed via the throttle 94 to the counter-pressure chamber 88. The lubricant is fed to the low-pressure area of the motor housing 18a via a shutter or throttle 100 and/or a check valve 102. As a result, a comparatively rapid pressure build-up is achieved, which ensures the required or desired installation of the movable compressor part 52 at the bottom area of the scroll disk 58a of the stationary compressor part 58. For this purpose, the lubricant return—starting from the lubricant separator 72—takes place via the separate lubricant channel 84, as a bypass from the high pressure area to the low pressure area.

The invention is not limited to the above-described exemplary embodiment. Rather, other variants of the invention may be derived therefrom by a person of ordinary skill in the art without departing from the subject matter of the invention. In particular, all the individual features described in connection with the exemplary embodiment may also be combined with each other in other ways, without departing from the subject matter of the invention.

For example, the compressor module 6 of the refrigerant drive 2 may also be implemented as a scroll expander. In this case, the refrigerant outlet 38 would be connected flow-wise as an inlet, and as an outlet to the refrigerant circuit, corresponding to the refrigerant inlet 36. This makes it possible to drive the electric motor 20, using expansion of the refrigerant in the scroll expander as a generator.

LIST OF REFERENCE SIGNS

2 Refrigerant drive/refrigerant compressor
4 Drive module
6 Compressor module
8 Interface
10 End shield
12 Flange connection
12a, 12b, 12c Flange
14 Screw receptacle
16 Fixing screw
18 Drive housing
18a Housing subarea/motor housing
18b Housing section/electronics housing
18c Housing partition wall
20 Electric motor
22 Motor electronics
24 Motor shaft
24a, 24b Roller bearings/ball bearings
26 Rotor
28 Stator
28a Laminated core
28b Stator/rotary field winding
30 Housing cover
32 End face
34 Housing connection section
34a, 34b Motor connection
36 Refrigerant inlet
38 Refrigerant outlet
40 Compressor housing
42a, 42b Joining pin/shaft pin
44 Central plate
46 Shaft extension
46a Balance weight
46b Shaft journal
48 Roller bearings/ball bearings
48a Inner ring
48b Outer ring
50 Bearing receptacle
52 Compressor part/scroll part
52a Scroll disk
52b Spiral body/scroll spiral
54 Opening
56 Slide ring
58 Compressor part/scroll part
58a Scroll disk
58b Spiral body/scroll spiral
58c Side wall
60 Scroll pair
62 Inlet opening
64 Intermediate portion/recess
66 Orifice opening/refrigerant opening
68 Orifice opening
70 Lubricant channel
72 Lubricant separator
74 Cover part
76 Pre-outlet
78 Bearing receptacle
80 Lubricant chamber
82 Valve/throttle
84 Lubricant channel
86 Throttle chamber
88 Counter-pressure chamber
90 Chamber entry/chamber inlet
92 Channel
94 Throttle/shutter
96 Gas channel
98 Chamber outlet/chamber outlet
100 Shutter/throttle
102 Check valve

The invention claimed is:

1. An electric refrigerant drive, comprising:
an electric motor drive module and a compressor module coupled to said drive module;
said drive module having a motor housing, said motor housing accommodating an electric motor with a rotatable motor shaft and being joined to an end shield, and a fluid-tight housing partition wall disposed opposite said end shield to form an electronics housing, said electronics housing accommodating motor electronics and being closed with a housing cover;
said compressor module having a compressor housing that is connected to said end shield of said motor housing of said drive module, said compressor housing accommodating a compressor part propulsively coupled, or configured to be propulsively coupled, with said drive module;

said compressor housing having a central plate on a drive-side housing end face of the compressor module; and said drive module and said compressor module being disposed to form a counter-pressure chamber for receiving a pressurized refrigerant between said end shield of said drive module and said central plate of said compressor module.

2. The electric refrigerant drive according to claim 1, which comprises a positive, form-locking connection for propulsively coupling said drive module to said compressor part of said compressor module.

3. The electric refrigerant drive according to claim 2, wherein said positive, form-locking connection is a plug connection.

4. The electric refrigerant drive according to claim 1, wherein said propulsive, coupling between said drive module and said compressor part comprises at least two radially mutually offset joining pins on a drive-side end face of said motor shaft facing the compressor module.

5. The electric refrigerant drive according to claim 1, wherein said counter-pressure chamber is configured for receiving lubricant-free refrigerant.

6. The electric refrigerant drive according to claim 1, wherein said central plate has at least one lubricant channel formed with an opening for lubricant delivery.

7. The electric refrigerant drive according to claim 1, wherein said at least one lubricant channel runs circularly and is opened to said drive module.

8. The electric refrigerant drive according to claim 1, further comprising a balance weight with an eccentric shaft extension coupled to the motor shaft, for converting a rotational movement of the motor shaft into an orbiting motion of a driven compressor part.

9. The electric refrigerant drive according to claim 8, wherein said coupled compressor part is a movable scroll part.

10. The electric refrigerant drive according to claim 8, wherein said eccentric shaft extension carries an inner ring of a roller bearing, and said roller bearing has an outer ring that is joined with the driven compressor part.

11. The electric refrigerant drive according to claim 1, wherein said end shield has at least one refrigerant opening to be flowed through, on an outer peripheral side.

12. The electric refrigerant drive according to claim 1, wherein said compressor part is a scroll part which is movably disposed relative to, and nested in, a scroll part that is stationary within said compressor housing.

13. The electric refrigerant drive according to claim 1, being a refrigerant compressor for an air conditioning system of a motor vehicle.

* * * * *